United States Patent
Min et al.

(10) Patent No.: US 12,026,196 B2
(45) Date of Patent: Jul. 2, 2024

(54) ERROR DETECTION AND CORRECTION FOR AUDIO CACHE

(71) Applicant: Comcast Cable Communications, LLC, Philadelphia, PA (US)

(72) Inventors: Rui Min, Vienna, VA (US); Stefan Deichmann, Alexandria, VA (US); Hongcheng Wang, Arlington, VA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 595 days.

(21) Appl. No.: 16/839,306

(22) Filed: Apr. 3, 2020

(65) Prior Publication Data

US 2021/0311989 A1   Oct. 7, 2021

(51) Int. Cl.
  *G06F 7/00*       (2006.01)
  *G06F 16/2455*    (2019.01)
  *G06F 16/632*     (2019.01)
  *G10L 19/018*     (2013.01)

(52) U.S. Cl.
  CPC ...... *G06F 16/634* (2019.01); *G06F 16/24552* (2019.01); *G10L 19/018* (2013.01)

(58) Field of Classification Search
  CPC ............. G06F 16/634; G06F 16/24552; G06F 16/24539; G06F 16/243; G06F 16/3334; G06F 16/90332; G06F 16/3329; G10L 19/018; G10L 15/02; G10L 15/26
  See application file for complete search history.

(56) References Cited

U.S. PATENT DOCUMENTS

| | | | |
|---|---|---|---|
| 5,809,471 A * | 9/1998 | Brodsky | H04H 20/38 704/275 |
| 6,122,613 A | 9/2000 | Baker | |
| 6,785,654 B2 | 8/2004 | Cyr et al. | |
| 8,224,644 B2 | 7/2012 | Krumel et al. | |
| 9,419,665 B2 * | 8/2016 | Ellis | G08C 19/00 |
| 9,620,104 B2 * | 4/2017 | Naik | G10L 15/22 |
| 9,728,188 B1 * | 8/2017 | Rosen | G10L 25/51 |
| 10,332,513 B1 * | 6/2019 | D'Souza | G10L 15/183 |
| 10,623,246 B1 * | 4/2020 | Iyer | H04L 12/2825 |
| 10,777,203 B1 * | 9/2020 | Pasko | G10L 15/18 |
| 10,909,983 B1 * | 2/2021 | Peng | G10L 15/1815 |
| 11,127,405 B1 * | 9/2021 | Antos | G10L 15/30 |
| 11,176,928 B2 * | 11/2021 | Schairer | G10L 15/22 |
| 2003/0151621 A1 * | 8/2003 | McEvilly | H04N 7/17354 715/744 |

(Continued)

*Primary Examiner* — Mohammed R Uddin
(74) *Attorney, Agent, or Firm* — BakerHostetler

(57) ABSTRACT

An audio file associated with a user voice query may be received at a user device. The audio file may be compared to a plurality of references, such as cache entries, corresponding to a plurality of other voice queries. Based on a determination that the voice query corresponds to one of the references, an operation associated with the voice query may be executed. An indication may be received that the operation was not an intended operation associated with the voice query. Based on receiving this indication, the incorrectly identified operation, associated reference, e.g., voice query, may be disabled for the user or the device. However, the cache entry may remain enabled for one or more of a plurality of other devices.

21 Claims, 5 Drawing Sheets

(56) References Cited

U.S. PATENT DOCUMENTS

| | | | | |
|---|---|---|---|---|
| 2004/0001161 | A1* | 1/2004 | Herley | H04H 60/56 |
| | | | | 348/465 |
| 2005/0114141 | A1* | 5/2005 | Grody | G10L 15/30 |
| | | | | 704/270 |
| 2007/0033005 | A1* | 2/2007 | Cristo | G10L 15/19 |
| | | | | 704/9 |
| 2009/0299752 | A1* | 12/2009 | Rodriguez | G06F 40/242 |
| | | | | 704/275 |
| 2014/0053180 | A1* | 2/2014 | Shoykher | G06F 3/0481 |
| | | | | 725/14 |
| 2014/0122059 | A1* | 5/2014 | Patel | G06F 16/40 |
| | | | | 704/9 |
| 2014/0278386 | A1* | 9/2014 | Konchitsky | G10K 11/002 |
| | | | | 704/226 |
| 2015/0109104 | A1* | 4/2015 | Fadell | H04L 67/12 |
| | | | | 340/5.65 |
| 2015/0235642 | A1* | 8/2015 | Nishikawa | G01C 21/3608 |
| | | | | 704/249 |
| 2015/0382071 | A1* | 12/2015 | Aravamudan | H04N 21/4755 |
| | | | | 725/14 |
| 2017/0116994 | A1* | 4/2017 | Wang | G10L 15/22 |
| 2018/0122378 | A1* | 5/2018 | Mixter | H04L 12/282 |
| 2018/0137267 | A1* | 5/2018 | Krieger | H04N 21/44218 |
| 2019/0318729 | A1* | 10/2019 | Chao | G10L 15/08 |
| 2020/0064960 | A1* | 2/2020 | Munemoto | G06F 3/04883 |
| 2021/0074286 | A1* | 3/2021 | Cotting | G06F 3/167 |
| 2021/0118439 | A1* | 4/2021 | Schillmoeller | G06F 3/04842 |

* cited by examiner

ERROR DETECTION AND CORRECTION FOR AUDIO CACHE

BACKGROUND

Speech recognition engines may be used to provide speech-based services for television and other areas, for example, by allowing users to control their television control devices or other control devices by speaking into their cellular telephones or into a hand-held remote control of the television or other control device. Speech recognition engines provide a number of advantages over traditional television control device remote or web interfaces by eliminating the need for typing or other keyboard-based or remote-based entry methods, such as TV or remote controllers. However, accuracy issues and incorrect problems persist and improvements to speech recognition processing is desirable.

SUMMARY

Methods and systems are described for controlling an audio cache of a user device. An audio file associated with a voice query may be received at a user device such as a voice activated device. The audio file may be compared to a plurality of cache entries corresponding to a plurality of other voice queries, such as popular voice queries associated with a content server. Based on a determination by the audio cache that the audio file corresponds to one or more of the cache entries, an operation associated with the voice query, such as tuning to a particular channel, may be executed. An indication may be received that the operation was not an intended operation of the voice query. A channel change or a repeat of the voice query by a user within a particular time frame of the executed operation may indicate that the operation was not an intended operation of the voice query. Based on receiving this indication, the cache entry that was incorrectly identified as corresponding to the voice query may be disabled for the user device. When a similar voice query is received at the user device after the cache entry has been disabled, the voice query may be sent to a speech recognition processor in order to recognize what the user said and to determine one or more operations to be performed in response to the voice query. However, the cache entry for a plurality of other devices, such as other user devices associated with the content server, may remain enabled in order to reduce network traffic and improve user experience.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION OF ILLUSTRATIVE EMBODIMENTS

Figure 1:
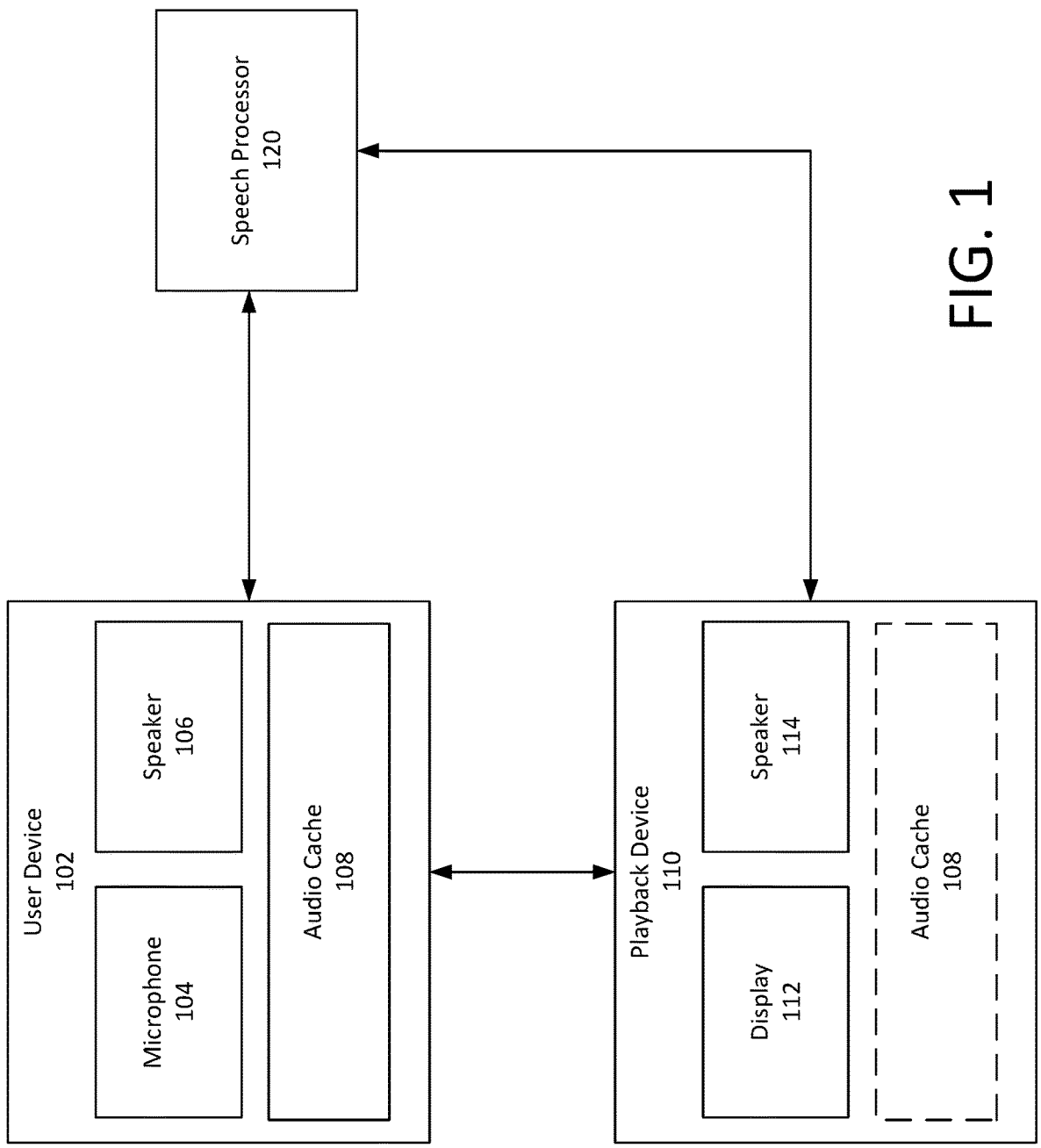
FIG. 1 shows a block diagram of an example system.

Methods and systems are described for controlling an audio cache of a user device. The user device may be configured to receive an audio file corresponding to a voice query and to determine whether the audio file is a first type of audio file or a second type of audio file. A first type of audio file may be an audio file that is capable of being processed at an audio cache of the device. The audio file may be compared to a plurality of cache entries corresponding to a plurality of other voice queries, such as popular voice queries associated with a content server, in order to determine an operation associated with the voice query. An example first type of audio file may comprise the voice query "tune to CNN." This type of voice query may be spoken very similarly by a variety of users. Thus, it may be possible to recognize that audio file as the utterance "tune to CNN" simply from acoustic characteristics of the audio file, without needed speech recognition.

In contrast, a second type of audio file may require speech recognition processing in order to recognize the voice query associated with the audio file. An example second type of audio file may comprise the voice command "show me all of the movies in which Harrison Ford is an actor." The second type of audio files may be harder to recognize, and speech recognition may be necessary to process those audio files in order to recognize what was uttered. The second type of audio files may be less common than the first types of audio files, and may not have corresponding cache entries stored in the audio cache for determining an intended operation associated with the voice query.

The audio cache may improve the user experience by reducing the need to send voice queries to third party speech processors, thereby providing results to the user more quickly and reducing network traffic. A hit accuracy of the audio cache may be very high (e.g., 99.5%). However, the small number of error cases may be frustrating to a user, particularly for errors that tend to repeat themselves. In an example, the audio cache may incorrectly identify a voice query "tune to CSN" as the more popular voice query "tune to CNN." This may occur for any number of reasons. Some error cases have so little traffic that they get ignored in the cache training data sets. Very few users may search for CSN, while a large amount of users may constantly tune to CNN. Other queries do have some traffic, but may be new such that the audio cache has not yet been trained using those queries.

In a first example solution, the cache entry for "CNN" may be disabled for all devices associated with the content provider. However, this may result in a large amount of unnecessary network traffic. When the cache entry for "CNN" is disabled, the voice query will be sent to a speech recognition engine for processing when a user utters either "tune to CSN" or "tune to CNN." In this example, out of a million "CNN" cache hit results, only less than 100 may have been incorrectly identified as "CSN." If the entry "CNN" is disabled, hundreds of thousands of extra queries will be unnecessarily sent to the speech recognition processor, resulting in high run-time overhead. In a second example solution, the reported error cases may be included in a negative query training data set so that the problem will be fixed in the next model. However, retraining a model takes time, and future errors cannot be prevented from happening. Thus, improvements to the audio cache may be necessary.

Methods and systems are described for controlling an audio cache of a user device. An audio file associated with a voice query may be received at a user device such as a voice activated device. The audio file may be compared to a plurality of cache entries corresponding to a plurality of other voice queries, such as popular voice queries associated with a content server. Based on a determination by the audio cache that the audio file corresponds to one or more of the cache entries, an operation associated with the voice query, such as tuning to a particular channel, may be executed. An indication may be received that the operation was not an intended operation of the voice query. A channel change or a repeat of the voice query by a user within a particular time frame of the executed operation may indicate that the operation was not an intended operation of the voice query. Based on receiving this indication, the cache entry that was incorrectly identified as corresponding to the voice query may be disabled for the user device. When a similar voice query is received at the user device after the cache entry has been disabled, the voice query may be sent to a speech recognition processor to determine what the user said and thereby determine one or more operations to be performed. However, the cache entry for a plurality of other devices, such as other user devices associated with the content server, may remain enabled in order to reduce network traffic and improve user experience.

FIG. 1 shows a block diagram of an example system 100. The system 100 may comprise a user device 102, a playback device 110, and a speech processor 120. The user device 102 may be configured to receive one or more voice queries and may comprise a microphone 104, a speaker 106, and an audio cache 108. The playback device 110 may be configured to playback one or more content assets and may comprise a display 112 and a speaker 114. The speech processor 120 may be configured to process one or more voice queries by performing speech recognition processing.

The user device 102 may comprise a voice-activated remote control for the playback device 110. For example, the playback device may comprise a television control device, such as a set box or the like. Alternatively, the user device 102 may comprise a voice-controlled digital assistant, a voice-controlled Internet of Things (IoT) device, a voice-activated controller for a security system or other premises management system, a home automation device, or any other device capable of being controlled by a voice query uttered by a user of the user device.

The user device 102 may be configured to receive a voice query from one or more users. The user device 102 may be a hands-free device that is configured to be operated using one or more voice queries. The user device 102 may additionally or alternatively comprise one or more buttons and may receive input from one or more users operating the one or more buttons. The user device 102 may be configured to receive voice queries via a microphone, such as microphone 104. The user device 102 may comprise a speaker, such as speaker 106. The speaker 106 may be configured to output audio in response to receipt of the voice query. For example, a voice query may be received through the microphone 104 comprising an utterance "what is the current temperature." In the context of a security system, home automation system, or other premises management system, a voice query may comprise an utterance such as "arm the system," "disarm the system," or "unlock the door." In response to the voice query, the user device 102 through the speaker 106 may output a response such as "the current temperature is seventy-six degrees or "the system is now armed." At least a portion of the user device 102 (e.g., the audio cache 108) may be implemented on a remote server. For example, all or a portion of the operations performed by the user device 102 may be implemented by a cloud server.

The audio cache 108 may be configured to process one or more audio files. A first type of audio file may be an audio file that is capable of being processed at the audio cache 108 of the user device 102. The audio file may be compared to a plurality of data entries associated with the audio cache (also referred to herein as "cache entries") which correspond to known, or preset, voice queries, such as popular voice queries associated with a content server, in order to determine an operation associated with the voice query. In contrast, a second type of audio file may require speech recognition processing in order to recognize the voice query associated with the audio file. The second type of audio files may be harder to recognize, and speech recognition may be necessary to process those audio files in order to recognize what was uttered. The second type of audio files may be less common than the first types of audio files, and may not have corresponding data entries stored in the audio cache 108 for determining an intended operation associated with the voice query.

The playback device 110 may be configured to cause playback of content to one or more users. The playback device 110 may receive one or more instructions from the user device 102, including but not limited to instructions to play, pause, stop, fast-forward, rewind, or record content. The playback device 110 and the user device 102 may be the same device. The display 112 of the device 110 may be configured to display or output content to the one or more audience members. The display 112 may be any device capable of displaying or outputting video or image content to an audience member, such as a tablet, a computer monitor, or a television screen. The display 112 may be part of the playback device 110 such as in the example that the playback device 110 is a tablet or a computer. The display 112 may be separate from the playback device 110 such as in an example that the playback device 110 is a television control device, such as a set top box, and the display 112 is a television screen in electrical communication with the television control device.

The speaker 114 may be configured to output audio associated with the content. The speaker 114 may be any device capable of outputting audio content. The speaker 114 may be part of the playback device 110 such as in the example that the device 112 is a tablet or a personal computer. The speaker 114 may be separate from the playback device 110 such as in an example that the playback device 110 is a television control device, such as a set top box, and the speaker 114 is a television or other external speaker in electrical communication with the television control device.

The speech processor 120 may be capable of performing speech recognition processing on one or more voice queries. The speech processor 120 may comprise, for example, one or more of a speech capture module, a digital signal processor (DSP) module, a preprocessed signal storage module, a reference speech pattern module and a pattern matching algorithm module. Speech recognition may be done in a variety of ways and at different levels of complexity, for example, using one or more of pattern matching, pattern and feature analysis, and language modeling and statistical analysis, as discussed further herein. However, it is understood that any type of speech recognition may be used, and the examples provided herein are not intended to limit the capabilities of the speech processor 120.

Pattern matching may comprise recognizing each word in its entirety and employing a pattern matching algorithm to match a limited number of words with stored reference speech patterns. An example implementation of pattern matching is a computerized switchboard. For example, a person who calls a bank may encounter an automated message instructing the user to say "one" for account balance, "two" for credit card information, or "three" to speak to a customer representative. In this example, the stored reference speech patterns may comprise multiple reference speech patterns for the words "one" "two" and "three." Thus, the computer analyzing the speech may not have to do any sentence parsing or any understanding of syntax. Instead, the entire chunk of sound may be compared to similar stored patterns in the memory.

Pattern and feature analysis may comprise breaking each word into bits and recognizing the bits from key features, for example, the vowels contained in the word. For example, pattern and feature analysis may comprise digitizing the sound using an analog to digital converter (A/D converter). The digital data may then be converted into a spectrogram, which is a graph showing how the component frequencies of the sound change in intensity over time. This may be done, for example, using a Fast Fourier Transform (FFT). The spectrogram may be broken into a plurality overlapping acoustic frames. These frames may be digitally processed in various ways and analyzed to find the components of speech they contain. The components may then be compared to a phonetic dictionary, such as one found in stored patterns in the memory.

Language modeling and statistical analysis is a more sophisticated speech recognition method in which knowledge of grammar and the probability of certain words or sounds following one from another is used to speed up recognition and improve accuracy. For example, complex voice recognition systems may comprise a vocabulary of over 50,000 words. Language models may be used to give context to words, for example, by analyzing the words proceeding and following the word in order to interpret different meanings the word may have. Language modeling and statistical analysis may be used to train a speech recognition system in order to improve recognition of words based on different pronunciations.

As discussed herein, the system 100 may allow a data entry (i.e., cache entry) of an audio cache to be enabled or disabled on a device by device basis. For the vast majority of users, keeping the cache entry enabled allows the voice query to be processed quickly and reduces network traffic, thereby improving the user experience. However, for the small number of users who experience a problem with the cache entry, such as an unintended operation being associated with the cache entry, the cache entry may be selectively disabled for the device in order to prevent the unintended operations from being executed.

Figure 2:
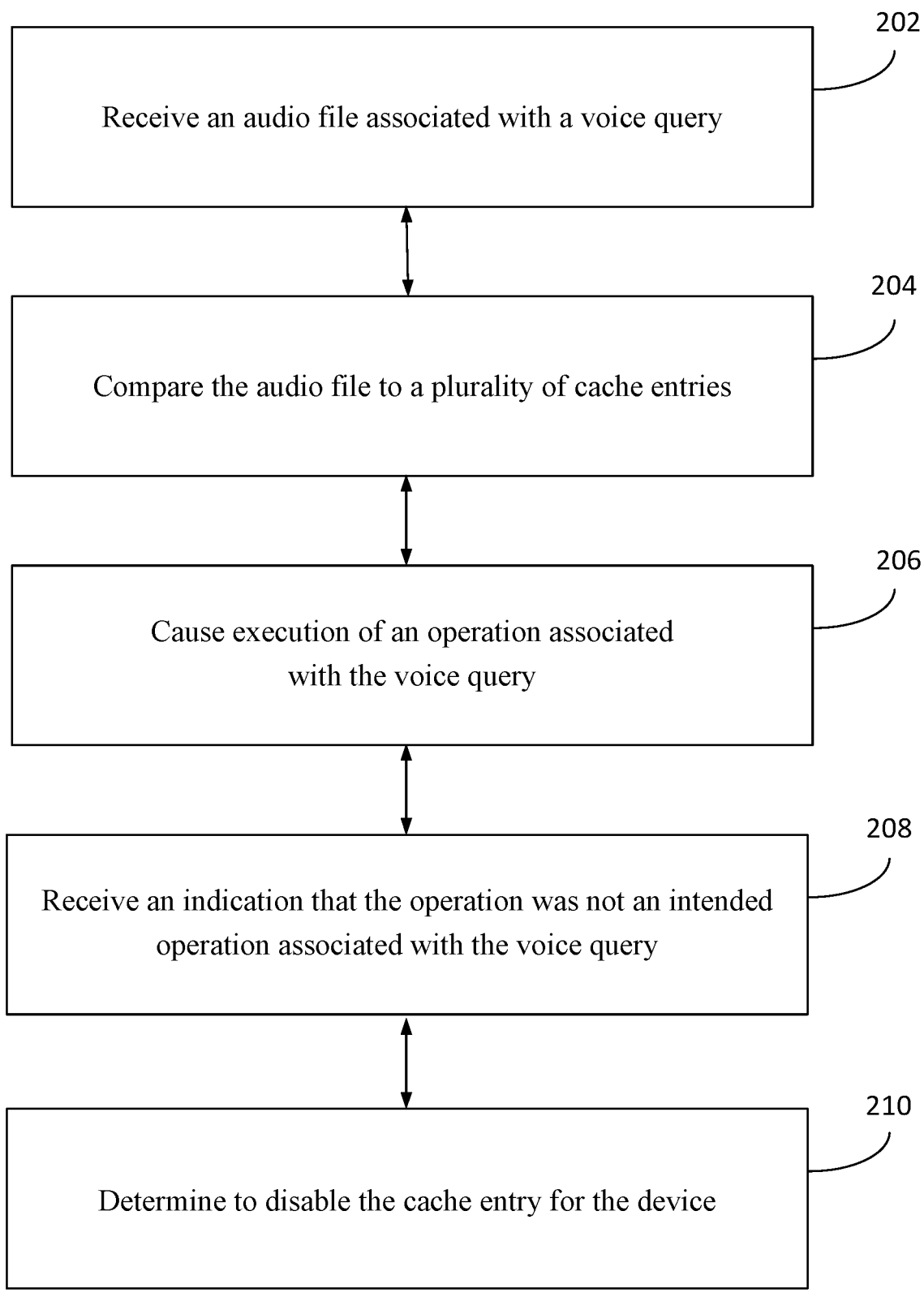
FIG. 2 shows a flow chart of an example method.

FIG. 2 shows a flow chart of an example method 200. At step 202, an audio file may be received. The audio file may be associated with a voice query. The audio file may be received at a device such as the user device 102 shown in FIG. 1. An example voice query may comprise the utterance "tune to CSN." The voice query may be received at a microphone of the user device 102, such as the microphone 104.

At step 204, the audio file may be compared to a plurality of cache entries. The comparison of the audio file to the plurality of cache entries may be performed by the audio cache 108 of the user device 102. The plurality of cache entries may correspond to one or more other voice queries, such as popular voice queries associated with a content provider or voice queries that have been previously received at the user device. The plurality of cache entries may comprise a plurality of audio transcriptions. Comparing the audio file to the plurality of cache entries may comprise generating an audio fingerprint based on the audio file and comparing the audio fingerprint to a plurality of audio fingerprints corresponding to the plurality of cache entries.

The audio fingerprint may comprise a randomly selected portion of the voice query, such as a sampling of the voice query captured once every 100 milliseconds. Comparing the audio file to the plurality of cache entries may comprise determining whether the audio file is a first type of audio file that is capable of being processed in an audio cache of the device or a second type of audio file that may require speech recognition processing.

At step 206, execution of an operation may be caused. The operation may be determined based on one or more of the voice query and the corresponding cache entry of the plurality of cache entries. The operation may be determined based on a determination that the audio file is a first type of audio file. The audio cache may determine that the voice query corresponds to a particular one of the cache entries. The user device may determine one or more operations to be performed based on determining that the voice query corresponds to the particular cache entry. However, it is understood that the audio cache may not operate with 100% accuracy. In the example that the voice query comprises the utterance "tune to CSN," the audio cache may process the voice query (e.g., by comparing the voice query to the plurality of cache entries) and may determine that the voice query corresponds to another voice query "tune to CNN." The user device may cause execution of an operation based on this determination, such as sending an instruction to the playback device to tune to CNN.

At step 208, an indication that the operation was not an intended operation associated with the voice query may be received. As described above, the user device may receive an audio file associated with a voice query "tune to CSN," determine that the voice query corresponds to a cache entry for another voice query "tune to CNN," and may cause execution of an operation associated with the other voice query. The operation may comprise sending an instruction to the playback device to tune to CNN. In the context of a security system, for example, an utterance of "disarm the system" could, for example as a result of background noise or a user speaking the utterance too quickly or a low voice, be determined to correspond to a cache entry associated with the voice query "arm the system," which is clearly not the intended operation for the utterance "disarm the system."

The user device may receive an indication that the executed operation was not an intended operation of the voice query. In the television-related example above, the user device may receive an indication that tuning to CNN was not the intended operation of the voice query "tune to CSN." The indication that the operation was not an intended operation associated with the voice query may comprise receiving at least one other audio file within a time frame of receiving the audio file associated with the voice query. A user of the user device may repeat the voice query to the user device 102 based on determining that the operation was not an intended operation of the voice query. In some examples, the user may repeat the voice query at a louder volume or in a different tone, indicating that the user was not satisfied with the executed operation. The indication that the operation was not an intended operation associated with the voice query may comprise receiving a request for a channel change or pressing of an "exit" button on the user device within a time frame of receiving the audio file associated with the voice query. If the user device receives an indication for a channel change, for example using another voice query or using one or more buttons associated with the user device, this may be an indication that the executed operation was not an intended operation associated with the voice query.

At step 210, the cache entry may be disabled. For example, the cache entry associated with the incorrectly executed operation may be disabled. The cache entry may be disabled based on receiving the indication that the operation was an incorrectly executed operation. In the example above, the cache entry for the voice query "tune to CNN" may be disabled in order to prevent future reoccurrences of the incorrectly executed operation. When future audio files associated with the voice query "tune to CSN" are received at the user device, the audio files may be compared to the plurality of cache entries in order to determine if there is a cache hit. However, since the user device does not have a cache entry for the voice query "tune to CSN," and since the cache entry for the voice query "tune to CNN" has been disabled, the user device may send the audio file directly to the speech recognition processor for processing. Disabling the cache entry may comprise deleting the cache entry from the cache. Disabling the cache entry may comprise marking the cache entry in the cache to indicate that it is disabled, such as by setting a flag associated with the cache entry in the memory of the cache. Disabling the cache entry may comprise preventing access to the cache entry.

The cache entry may be disabled only for the particular device, such as the user device 102. Alternatively, or in addition, the cache entry may be disabled for a particular user of a user device, where for example different users share the user device and may have different rules associated with their use of it. The cache entry may additionally or alternatively be disabled for one or more other user devices associated with the content server. However, the cache entry may remain enabled for one or more of the other user devices associated with the content server. By selectively disabling the cache entry, the overall user experience may be improved. For user devices that can correctly distinguish between the voice queries "tune to CSN" and "tune to CNN," the cache entry for the voice query "tune to CNN" may remain enabled. When a voice query is received to "tune to CNN," the user device may be able to process this request in the audio cache, thereby providing a quick response to the user and reducing network traffic. However, for the user device at which the cache entry "tune to CNN" has been disabled, mistakes in speech recognition processing may be avoided.

The audio file may be sent to a server, such as the speech recognition processor 120, based on the indication that the operation was not an intended operation associated with the voice query. The user device may receive, from the server, based on the server performing speech recognition processing on the audio file, an audio transcription associated with the voice query. The user device may determine that the audio transcription associated with the voice query corresponds to the cache entry. The user device may determine, based on receiving the indication, and based on determining that the audio transcription associated with the voice query corresponds to the cache entry, that the executed operation was a correctly executed operation associated with the voice query. Therefore, the user device may determine not to disable the cache entry for the device. When the audio transcription matches the cache entry, this may be an indication that the cache entry and, therefore, the corresponding executed operation was correct. However, even if both the cache entry and the audio transcription would result in an incorrect operation, the cache entry still would not be disabled, because sending the audio file to the speech processor would lead to the same result and would not improve the user experience.

In an example that the original voice query comprises the utterance "tune to CNN," the device may compare the utterance to the plurality of cache entries and may execute the operation of sending to the playback device an indication to tune to CNN. Thereafter, and within a given timeframe of the executed operation, the device may receive an indication such as a channel change, and may send the audio file to the speech recognition processor. If the speech recognition processor returns an audio transcription corresponding to the voice query "tune to CNN," the user device may determine not to disable the cache entry. However, if the speech recognition processor returns an audio transcription that does not correspond to the voice query "tune to CNN," such as receiving an audio transcription that corresponds to the voice query "tune to CSN," the user device may proceed to disable the cache entry.

The user device may determine that there has been an update to the plurality of cache entries. The user device may determine, based on the update to the plurality of cache entries, to enable the cache entry for the user device. The user device may determine that there has been an update to the particular cache entry (e.g., CNN or CSN), and may update the particular cache entry based on this determination. The user device may determine that an amount of time has passed since the cache entry was disabled, and may determine to enable the cache entry based on this determination.

It is understood that a cache entry may be enabled or disabled based on one or more voice queries for which executed operations have been determined to be incorrect. The cache entry "tune to CNN" may be disabled as a result of the voice query "tune to CSN" being incorrectly identified as corresponding to the cache entry "tune to CNN." The cache entry "tune to CNN" may additionally be disabled based on another voice query (e.g., "tune to CMN") that was incorrectly identified as corresponding to the cache entry "tune to CNN." If the audio cache is updated to remove (e.g., enable) a given one of the disabled entries (e.g., "tune to CSN"), but remains disabled based on at least one other voice query (e.g., "tune to CMN"), the cache entry may continue to be disabled until all corresponding voice queries have been removed from the disable list. A cache entry may additionally or alternatively be enabled or disabled based on a passage of time. For example, if the user device has not detected a request for "tune to CSN" for a period of time (e.g., three months), the user device may determine to enable the cache entry for "tune to CNN."

Figure 3:
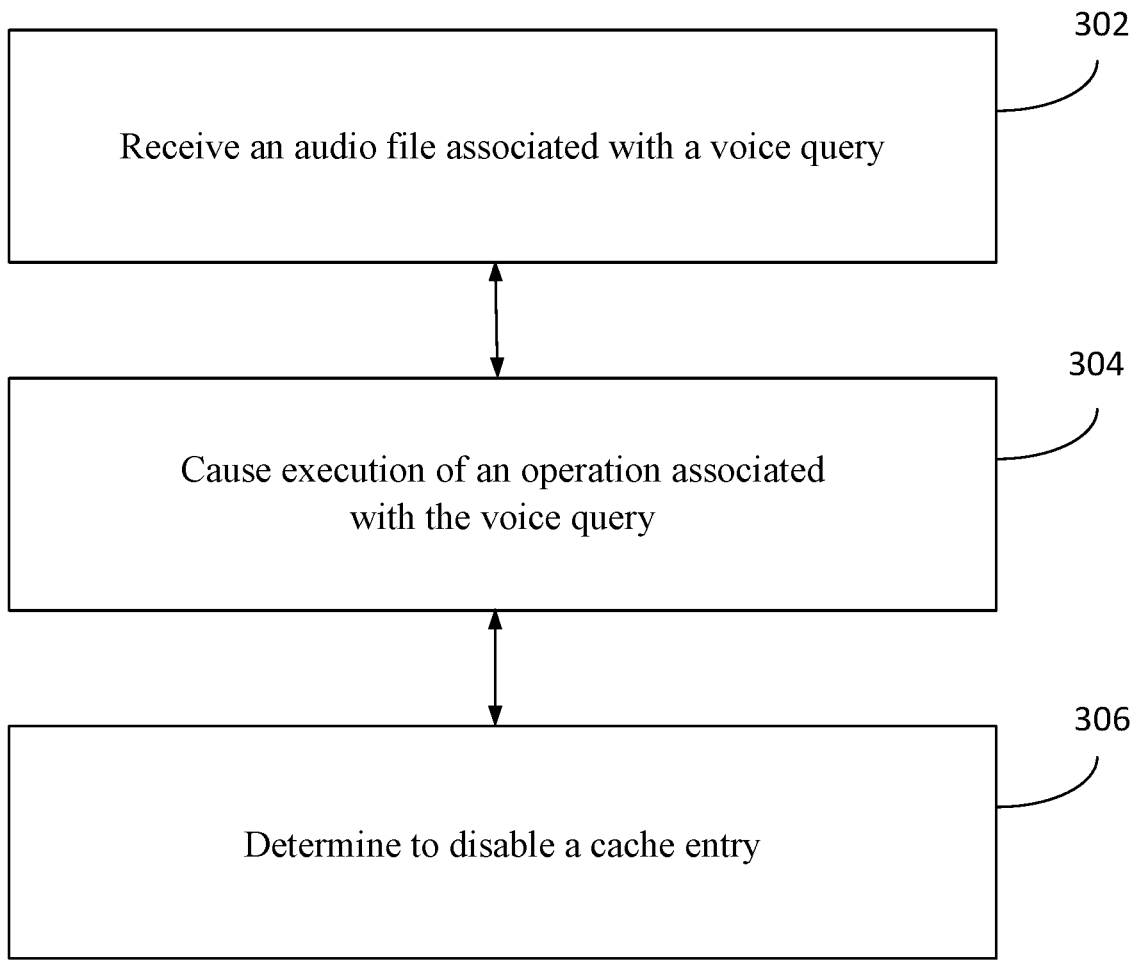
FIG. 3 shows a flow chart of an example method.

FIG. 3 shows a flow chart of another example method 300. At step 302, an audio file may be received. The audio file may be associated with a voice query. The audio file may be received at a device such as the user device 102 shown in FIG. 1. An example voice query may comprise the utterance "tune to CSN." The voice query may be received at a microphone of the user device 102, such as the microphone 104.

The audio file may be compared to a plurality of cache entries. The comparison of the audio file to the plurality of cache entries may be performed by the audio cache 108 of the user device 102. The plurality of cache entries may correspond to one or more other voice queries, such as popular voice queries associated with a content provider or voice queries that have been previously received at the user device. The plurality of cache entries may comprise a plurality of audio transcriptions. Comparing the audio file to the plurality of cache entries may comprise generating an audio fingerprint based on the audio file and comparing the audio fingerprint to a plurality of audio fingerprints corresponding to the plurality of cache entries. The audio fingerprint may comprise a randomly selected portion of the voice query, such as a sampling of the voice query captured once every 100 milliseconds. Comparing the audio file to the plurality of cache entries may comprise determining whether the audio file is a first type of audio file that is capable of being processed in an audio cache of the device or a second type of audio file that may require speech recognition processing.

At step 304, execution of an operation may be caused. The operation may be determined based on one or more of the voice query and the corresponding cache entry of the plurality of cache entries. The operation may be determined based on a determination that the audio file is a first type of audio file. The audio cache may determine that the voice query corresponds to a particular one of the cache entries. The user device may determine one or more operations to be performed based on determining that the voice query corresponds to the particular cache entry. However, it is understood that the audio cache may not operate with 100% accuracy. In the example that the voice query comprises the utterance "tune to CSN," the audio cache may process the voice query (e.g., by comparing the voice query to the plurality of cache entries) and may determine that the voice query corresponds to another voice query "tune to CNN." The user device may cause execution of an operation based on this determination, such as sending an instruction to the playback device to tune to CNN.

At step 306, a cache entry may be disabled. The user device may receive an indication that the executed operation was not an intended operation of the voice query. In this example, the user device may receive an indication that tuning to CNN was not the intended operation of the voice query "tune to CSN." The indication that the operation was not an intended operation associated with the voice query may comprise receiving at least one other audio file within a time frame of receiving the audio file associated with the voice query. A user of the user device may repeat the voice query to the user device 102 based on determining that the operation was not an intended operation of the voice query. In some examples, the user may repeat the voice query at a louder volume or in a different tone, indicating that the user was not satisfied with the executed operation. The indication that the operation was not an intended operation associated with the voice query may comprise receiving a request for a channel change within a time frame of receiving the audio file associated with the voice query. If the user device receives an indication for a channel change, for example using another voice query or using one or more buttons associated with the user device, this may be an indication that the executed operation was not an intended operation associated with the voice query.

The cache entry associated with the incorrectly executed operation may be disabled. The cache entry may be disabled based on receiving the indication that the operation was an incorrectly executed operation. In the example above, the cache entry for the voice query "tune to CNN" may be disabled in order to prevent future reoccurrences of the incorrectly executed operation. When future audio files associated with the voice query "tune to CSN" are received at the user device, the audio files may be compared to the plurality of cache entries in order to determine if there is a cache hit. However, since the user device does not have a cache entry for the voice query "tune to CSN," and since the cache entry for the voice query "tune to CNN" has been disabled, the user device may send the audio file directly to the speech recognition processor for processing.

The cache entry may be disabled only for the particular device, such as the user device 102. The cache entry may additionally or alternatively be disabled for one or more other user devices associated with the content server. However, the cache entry may remain enabled for one or more of the other user devices associated with the content server. By selectively disabling the cache entry, the overall user experience may be improved. For user devices that can correctly distinguish between the voice queries "tune to CSN" and "tune to CNN," the cache entry for the voice query "tune to CNN" may remain enabled. When a voice query is received to "tune to CNN," the user device may be able to process this request in the audio cache, thereby providing a quick response to the user and reducing network traffic. However, for the user device at which the cache entry "tune to CNN" has been disabled, mistakes in speech recognition processing may be avoided.

Figure 4:
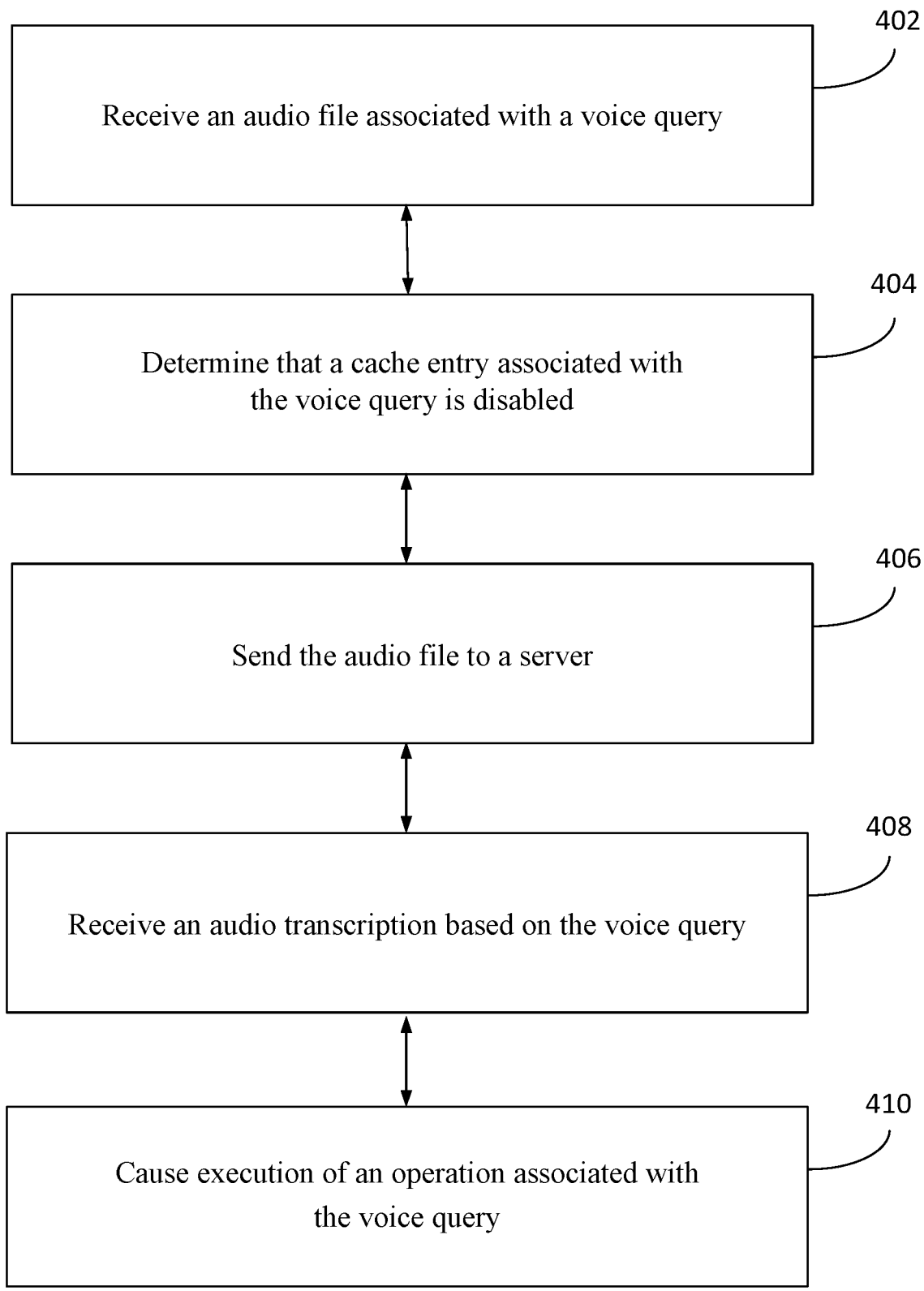
FIG. 4 shows a flow chart of an example method.

FIG. 4 shows a flow chart of another example method 400. At step 402, an audio file may be received. The audio file may be associated with a voice query. The audio file may be received at a device such as the user device 102 shown in FIG. 1. An example voice query may comprise the utterance "tune to CNN." The voice query may be received at a microphone of the user device 102, such as the microphone 104.

At step 404, it may be determined that a cache entry corresponding to the voice query is disabled. The cache entry corresponding to the cache entry may be disabled at the user device. The comparison of the audio file to the plurality of cache entries may be performed by the audio cache 108 of the user device 102. The plurality of cache entries may correspond to one or more other voice queries, such as popular voice queries associated with a content provider or voice queries that have been previously received at the user device. The plurality of cache entries may comprise a plurality of audio transcriptions. Comparing the audio file to the plurality of cache entries may comprise generating an audio fingerprint based on the audio file and comparing the audio fingerprint to a plurality of audio fingerprints corresponding to the plurality of cache entries. The audio fingerprint may comprise a randomly selected portion of the voice query, such as a sampling of the voice query captured once every 100 milliseconds.

The user device may compare the audio file of the voice query "tune to CNN" with the plurality of cache entries and may determine that the cache entry corresponding to the voice query "tune to CNN" has been disabled. Based on determining that the cache entry corresponding to the voice query "tune to CNN" has been disabled, the device may send the audio file to the server for processing. Determining that the cache entry has been disabled may comprise comparing the audio file to the plurality of cache entries and determining that there is not a corresponding cache entry for the received audio file.

At step 406, the user device may send the audio file associated with the voice query to a server. The server may be a speech processor, such as the speech processor 120 shown in FIG. 1. The speech processor may be configured to perform speech recognition processing on the audio file, using one or more of the methods described herein, including but not limited to pattern matching, pattern and feature analysis, and language modeling and statistical analysis.

At step 408, an audio transcription based on the audio file associated with the voice query may be received. The audio transcription may be received from the server, such as the speech recognition processor. The audio file may correspond to a voice query that would have been a cache hit had the cache entry not been disabled. For example, the device may receive an audio file associated with the voice query "tune to CNN" and may determine that the cache entry associated with the voice query "tune to CNN" has been disabled. The audio file may correspond to a voice query that would not have been a cache hit had the cache entry not been disabled. For example, the device may receive an audio file associated with a voice query "tune to CSN." The device may incorrectly associate this audio file with the disabled cache entry for "tune to CNN." However, since the cache entry for "tune to CNN" has been disabled, the device will use the audio transcription received from the server in determining an operation to be performed.

At step 410, execution of an operation associated with the voice query may be caused. The operation may be executed based on the audio transcription. The user device may analyze the audio transcription in order to determine an corresponding operation associated with the voice query. In the example that the server returns the audio transcription for the voice query "tune to CNN," the user device may determine to send to a playback device, such as the playback device 110, an instruction to tune to CNN.

Figure 5:
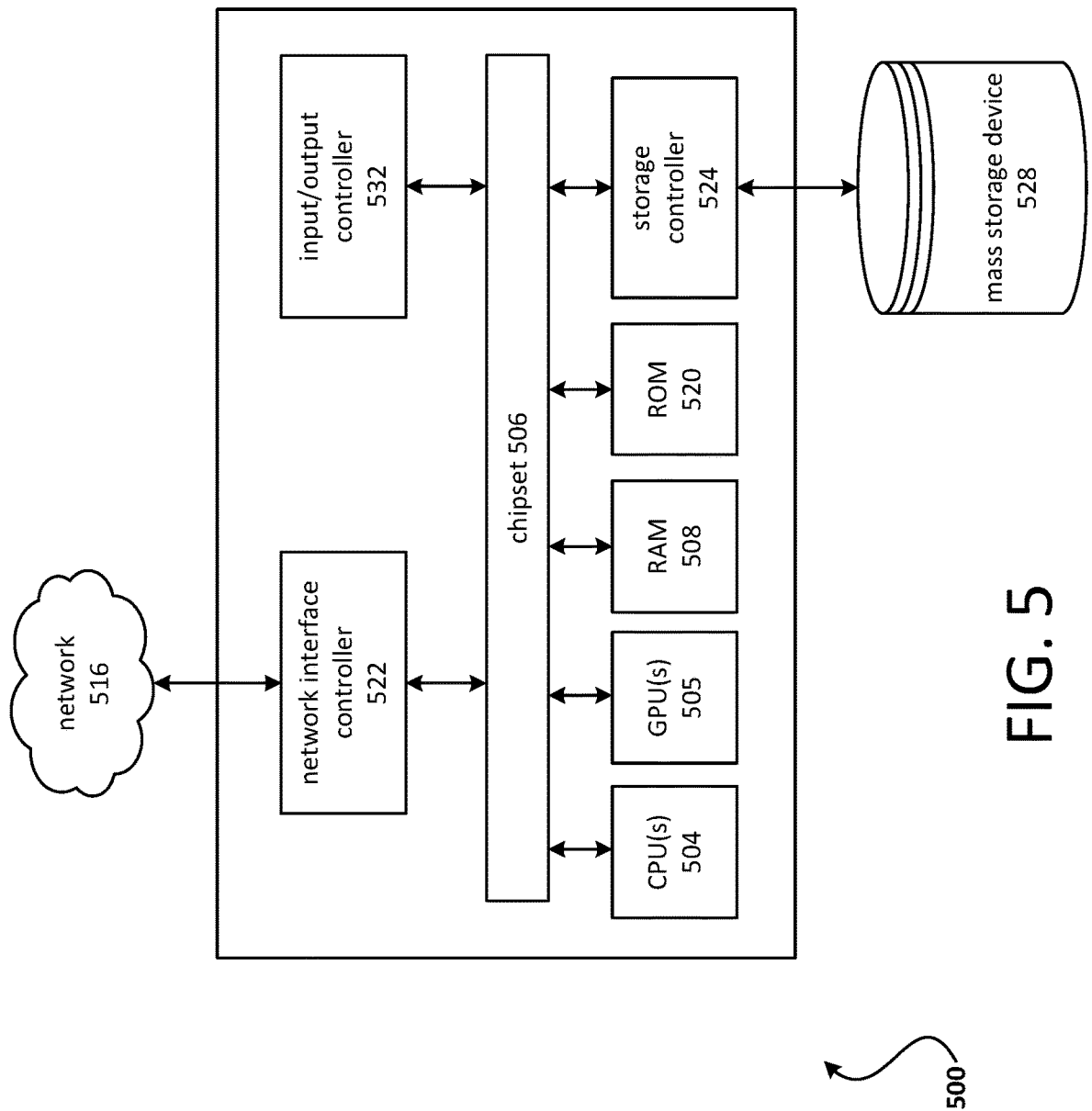
FIG. 5 shows a block diagram of an example computing device.

FIG. 5 depicts a computing device that may be used in various aspects, such as the servers, modules, and/or devices depicted in FIG. 1. With regard to the example architecture of FIG. 1, the server 102, the media file processor 104, the encoder 106, the database 108, the device 108, the processor 110, the display 112, and/or the speaker 114 may each be implemented in an instance of a computing device 500 of FIG. 5. The computer architecture shown in FIG. 5 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 3 and 4.

The computing device 500 may include a baseboard, or "motherboard," which is a printed circuit board to which a multitude of components or devices may be connected by way of a system bus or other electrical communication paths. One or more central processing units (CPUs) 504 may operate in conjunction with a chipset 506. The CPU(s) 504 may be standard programmable processors that perform arithmetic and logical operations necessary for the operation of the computing device 500.

The CPU(s) 504 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 504 may be augmented with or replaced by other processing units, such as GPU(s) 505. The GPU(s) 505 may comprise processing units specialized for but not necessarily limited to highly parallel computations, such as graphics and other visualization-related processing.

A user interface may be provided between the CPU(s) 504 and the remainder of the components and devices on the baseboard. The interface may be used to access a random access memory (RAM) 508 used as the main memory in the computing device 500. The interface may be used to access a computer-readable storage medium, such as a read-only memory (ROM) 520 or non-volatile RAM (NVRAM) (not shown), for storing basic routines that may help to start up the computing device 500 and to transfer information between the various components and devices. ROM 520 or NVRAM may also store other software components necessary for the operation of the computing device 500 in accordance with the aspects described herein. The user interface may be provided by a one or more electrical components such as the chipset 506.

The computing device 500 may operate in a networked environment using logical connections to remote computing nodes and computer systems through local area network (LAN) 516. The chipset 506 may include functionality for providing network connectivity through a network interface controller (NIC) 522, such as a gigabit Ethernet adapter. A NIC 522 may be capable of connecting the computing device 500 to other computing nodes over a network 516. It should be appreciated that multiple NICs 522 may be present in the computing device 500, connecting the computing device to other types of networks and remote computer systems.

The computing device 500 may be connected to a storage device 528 that provides non-volatile storage for the computer. The storage device 528 may store system programs, application programs, other program modules, and data, which have been described in greater detail herein. The storage device 528 may be connected to the computing device 500 through a storage controller 524 connected to the chipset 506. The storage device 528 may consist of one or more physical storage units. A storage controller 524 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 500 may store data on a storage device 528 by transforming the physical state of the physical storage units to reflect the information being stored. The specific transformation of a physical state may depend on various factors and on different implementations of this description. Examples of such factors may include, but are not limited to, the technology used to implement the physical storage units and whether the storage device 528 is characterized as primary or secondary storage and the like.

For example, the computing device 500 may store information to the storage device 528 by issuing instructions through a storage controller 524 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 500 may read information from the storage device 528 by detecting the physical states or characteristics of one or more particular locations within the physical storage units.

In addition to the storage device 528 described herein, the computing device 500 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 500.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A storage device, such as the storage device 528 depicted in FIG. 5, may store an operating system utilized to control the operation of the computing device 500. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The storage device 528 may store other system or application programs and data utilized by the computing device 500.

The storage device 528 or other computer-readable storage media may also be encoded with computer-executable instructions, which, when loaded into the computing device 500, transforms the computing device from a general-purpose computing system into a special-purpose computer capable of implementing the aspects described herein. These computer-executable instructions transform the computing device 500 by specifying how the CPU(s) 504 transition between states, as described herein. The computing device 500 may have access to computer-readable storage media storing computer-executable instructions, which, when executed by the computing device 500, may perform the methods described in relation to FIGS. 3 and 4.

A computing device, such as the computing device 500 depicted in FIG. 5, may also include an input/output controller 532 for receiving and processing input from a number of input devices, such as a keyboard, a mouse, a touchpad, a touch screen, an electronic stylus, or other type of input device. Similarly, an input/output controller 532 may provide output to a display, such as a computer monitor, a flat-panel display, a digital projector, a printer, a plotter, or other type of output device. It will be appreciated that the computing device 500 may not include all of the components shown in FIG. 5, may include other components that are not explicitly shown in FIG. 5, or may utilize an architecture completely different than that shown in FIG. 5.

As described herein, a computing device may be a physical computing device, such as the computing device 500 of FIG. 5. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes¬from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
  receiving, at a device, an audio file associated with a voice query;
  comparing the audio file to a plurality of cache entries;
  causing, based on a cache entry of the plurality of cache entries, execution of an operation associated with the voice query;
  receiving an indication that the operation was not an intended operation associated with the voice query; and
  determining, based on receiving the indication, to disable the cache entry for the device, wherein the cache entry remains enabled for one or more other devices.

2. The method of claim 1, wherein each of the plurality of cache entries comprises an audio fingerprint corresponding to a known voice query.

3. The method of claim 2, wherein comparing the audio file to the plurality of cache entries comprises comparing an audio fingerprint associated with the audio file to the audio fingerprints associated with each of the plurality of cache entries.

4. The method of claim 1, wherein receiving the indication comprises receiving at least one other audio file within a time frame of receiving the audio file associated with the voice query.

5. The method of claim 1, wherein receiving the indication comprises receiving a request for a channel change within a time frame of receiving the audio file associated with the voice query.

6. The method of claim 1, wherein causing execution of the operation associated with the voice query comprises determining that the audio file corresponds to the cache entry and performing an operation associated with the corresponding cache entry.

7. The method of claim 1, wherein determining to disable the cache entry comprises at least one of: deleting the cache entry, preventing access to the cache entry, marking the cache entry to indicate it is disabled, or setting a flag associated with the cache entry.

8. The method of claim 1, further comprising:
sending the audio file to a server for processing;
receiving an audio transcription based on the audio file associated with the voice query;
determining that the audio transcription corresponds to the cache entry; and
determining, based on receiving the indication, and based on determining that the audio transcription associated with the voice query corresponds to the cache entry, not to disable the cache entry for the device.

9. The method of claim 1, further comprising:
determining that there has been an update to one or more of the plurality of cache entries; and
enabling the cache entry for the device.

10. A method comprising:
receiving an audio file associated with a voice query;
causing, based on a comparison of the audio file to a plurality of cache entries, execution of an operation associated with the voice query; and
determining, based on an indication that the operation was not an intended operation associated with the voice query, to disable a cache entry of the plurality of cache entries.

11. The method of claim 10, wherein each of the plurality of cache entries comprises an audio fingerprint corresponding to a known voice query.

12. The method of claim 10, wherein receiving the indication comprises receiving at least one other audio file within a time frame of receiving the audio file associated with the voice query.

13. The method of claim 10, wherein receiving the indication comprises receiving a request for a channel change within a time frame of receiving the audio file associated with the voice query.

14. The method of claim 10, wherein causing execution of the operation associated with the voice query comprises determining that the audio file corresponds to the cache entry and performing an operation associated with the corresponding cache entry.

15. The method of claim 10, wherein the cache entry is disabled for a particular device, wherein the cache entry remains enabled for one or more other devices, and wherein the device and the one or more other devices are associated with a content server.

16. The method of claim 10, further comprising:
sending the audio file to a server for processing;
receiving an audio transcription based on the audio file associated with the voice query;
determining that the audio transcription corresponds to the cache entry; and
determining, based on receiving the indication, and based on determining that the audio transcription associated with the voice query corresponds to the cache entry, not to disable the cache entry.

17. The method of claim 10, further comprising:
determining that there has been an update to one or more of the plurality of cache entries; and
enabling the cache entry.

18. The method of claim 10, wherein determining to disable the cache entry comprises at least one of: deleting the cache entry, preventing access to the cache entry, marking the cache entry to indicate it is disabled, or setting a flag associated with the cache entry.

19. A method comprising:
receiving, at a device, an audio file associated with a voice query;
determining that a cache entry corresponding to the voice query is disabled at the device;
sending, to a server, the audio file associated with the voice query;
receiving, from the server, an audio transcription based on the voice query; and
causing, based on the audio transcription, execution of an operation associated with the voice query.

20. The method of claim 19, further comprising:
receiving, at the device, the audio file associated with the voice query;
comparing the audio file to a plurality of cache entries;
causing, based on a cache entry of the plurality of cache entries, execution of an operation associated with the voice query;
receiving an indication that the operation was not an intended operation associated with the voice query; and
determining, based on receiving the indication, to disable the cache entry for the device.

21. The method of claim 20, wherein the cache entry remains enabled for one or more other devices, and wherein the device and the one or more other devices are associated with a content server.

* * * * *